(No Model.) 3 Sheets—Sheet 1.

M. N. BRAY.
MACHINE FOR COVERING METALLIC ARTICLES WITH PLASTIC MATERIAL.

No. 544,656. Patented Aug. 20, 1895.

Witnesses:
Walter E. Lombard.
H. Theodore Fletcher

Inventor:
Mellen N. Bray,
by N. C. Lombard
Attorney.

(No Model.)  3 Sheets—Sheet 2.

M. N. BRAY.
MACHINE FOR COVERING METALLIC ARTICLES WITH PLASTIC MATERIAL.

No. 544,656. Patented Aug. 20, 1895.

Witnesses:
Walter E. Lombard.
H. Theodore Fletcher

Inventor:
Mellen N. Bray,
by N. C. Lombard
Attorney.

(No Model.) 3 Sheets—Sheet 3.
M. N. BRAY.
MACHINE FOR COVERING METALLIC ARTICLES WITH PLASTIC MATERIAL.
No. 544,656. Patented Aug. 20, 1895.
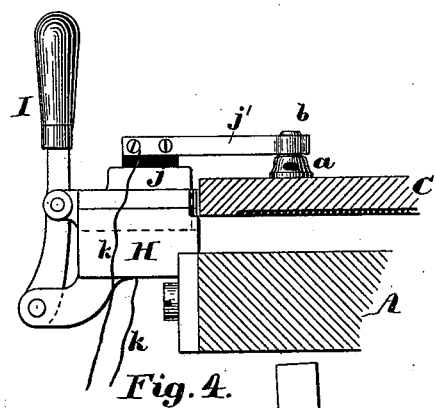
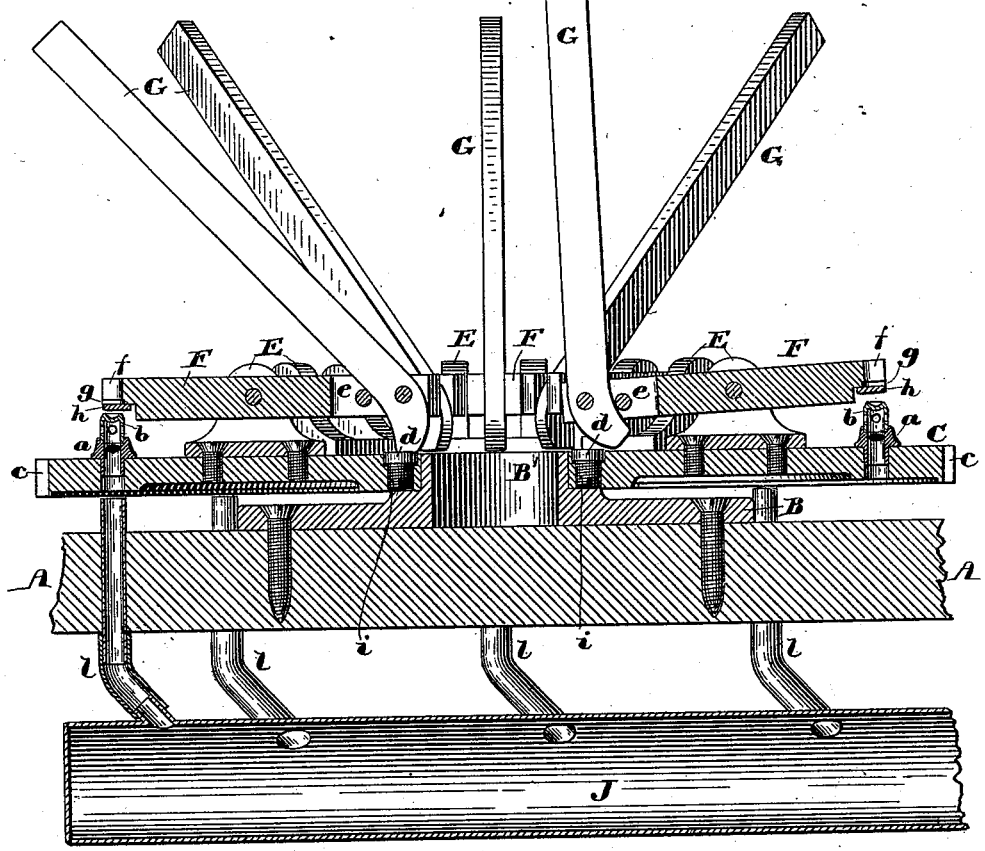
Witnesses:
Walter E. Lombard.
H. Theodore Fletcher
Inventor:
Mellen N. Bray,
by N. C. Lombard
Attorney.

UNITED STATES PATENT OFFICE.

MELLEN N. BRAY, OF BOSTON, MASSACHUSETTS.

MACHINE FOR COVERING METALLIC ARTICLES WITH PLASTIC MATERIAL.

SPECIFICATION forming part of Letters Patent No. 544,656, dated August 20, 1895.

Application filed May 25, 1895. Serial No. 550,666. (No model.)

*To all whom it may concern:*

Be it known that I, MELLEN N. BRAY, of Boston, in the county of Suffolk and State of Massachusetts, have invented certain new and useful Improvements in Machines for Covering Metallic Articles with Plastic Material, of which the following, taken in connection with the accompanying drawings, is a specification.

My invention relates to machines for covering metallic articles with plastic material; and it consists in certain novel features of construction, arrangement, and combination of parts, which will be readily understood by reference to the description of the accompanying drawings, and to the claims hereto appended and in which my invention is clearly pointed out.

Figure 1:
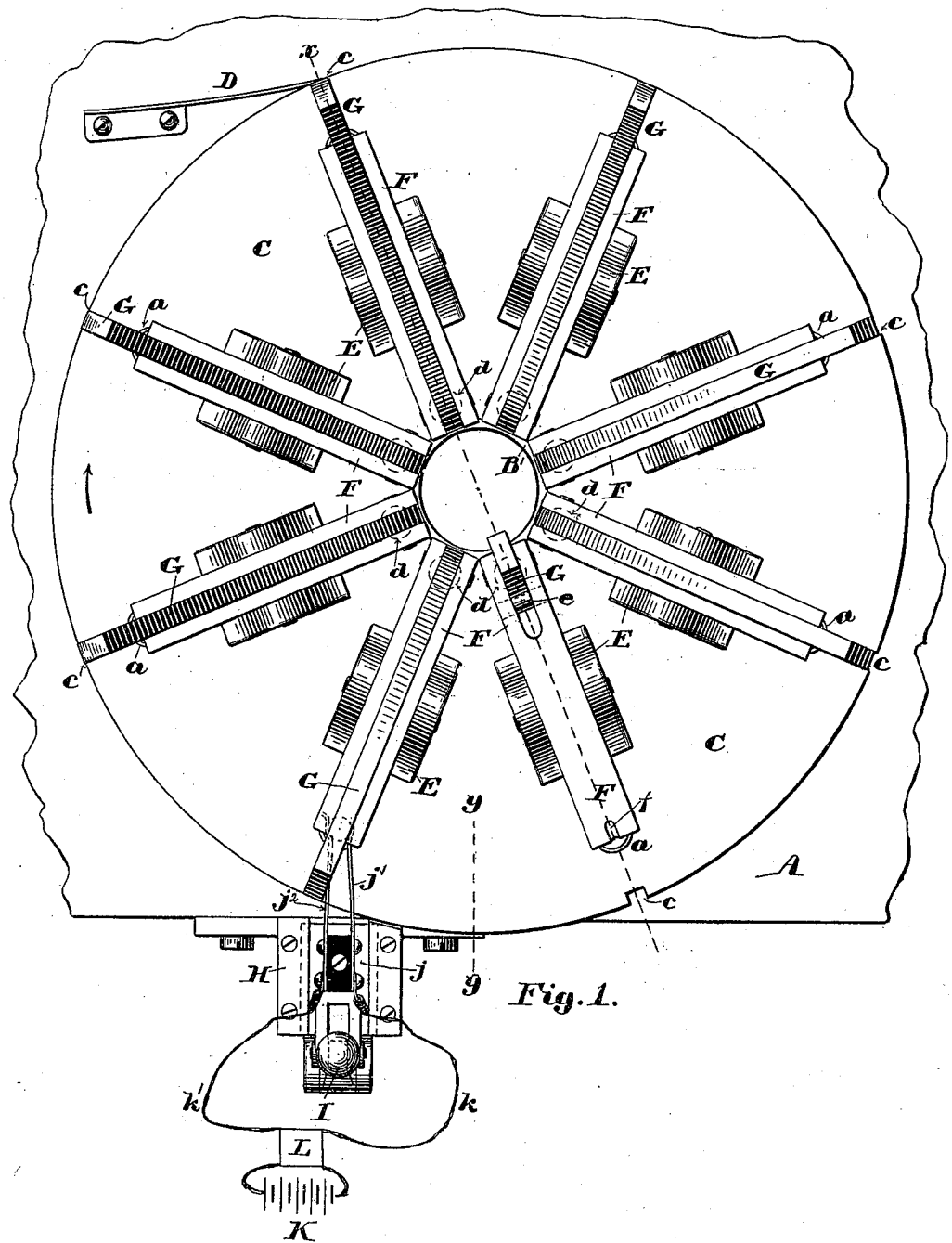
Figure 2:
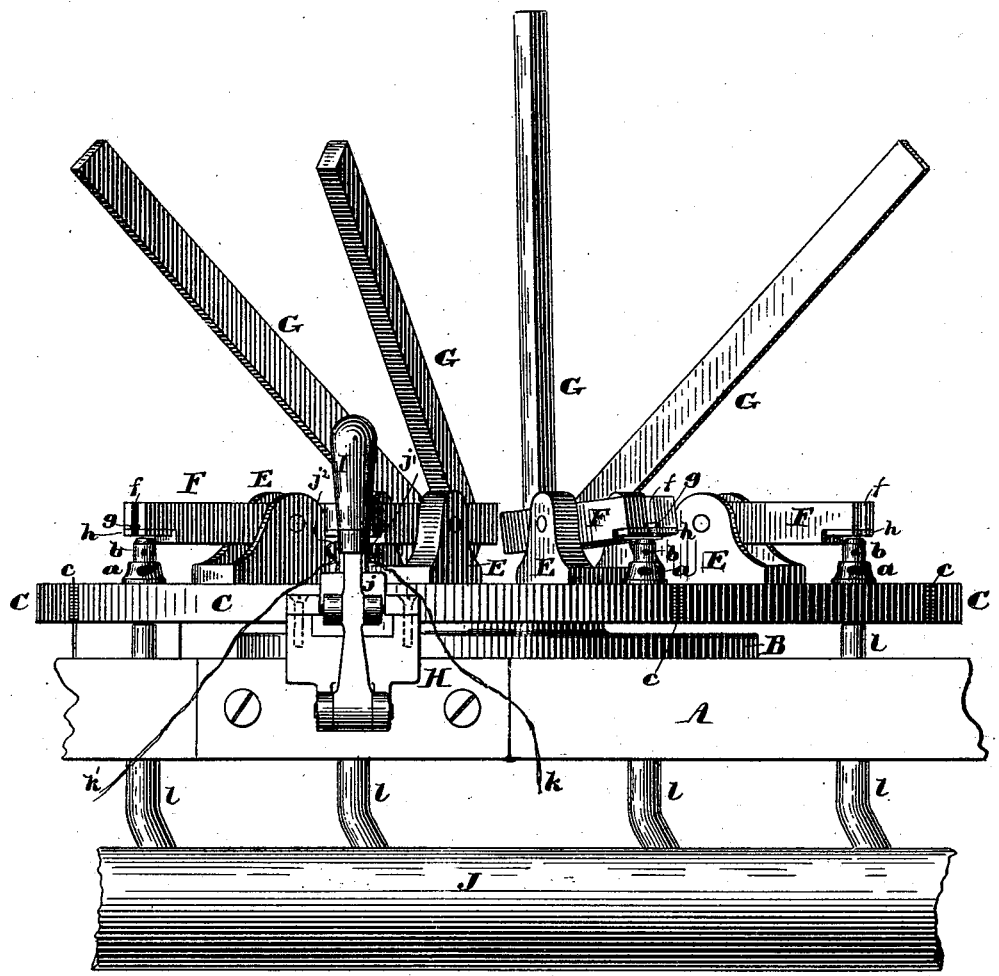

Figure 1 of the drawings is a plan of a machine embodying my invention. Fig. 2 is a front elevation of the same. Fig. 3 is a vertical section on line $x\ x$ on Fig. 1, and Fig. 4 is a partial vertical section on line $y\ y$ on Fig. 1.

In the drawings, A is a bench or table upon which is secured in a fixed position the disk-like plate B, provided with the short upwardly-projecting hub B', upon which is mounted, so as to be revoluble thereon, the circular bed-plate C, in which are set a series of tubular sockets $a\ a$, near its outer edge and equidistant from each other, and in each of said sockets is set a hollow or chambered die $b$, having a cavity in its upper end of the desired shape to be given to the outer surface of the covering of plastic material when molded upon the metallic article, which in the case herein illustrated is a lacing stud or hook.

The bed-plate C has formed in its periphery a series of rectangular notches $c$, corresponding to the number of dies $b$ mounted on said plate, which serve, in connection with the spring-stop D, which engages therewith, to register said circular plate in position after each intermittent movement about its axis.

The bed-plate C has secured to its upper surface a series of stands E, corresponding in number to the number of dies $b$ that are carried by said plate, to each of which stands is pivoted at its middle a bar F, forked at its inner end, and has pivoted thereto within said fork a cam-lever G, the short or cam arm of which acts upon the hardened-steel disk $d$, set in the bed-plate C beneath the rear end of the bar F, to raise the rear end of the arm F and correspondingly depress the outer end of said bar to compress and mold the plastic material placed on the die.

The bar F has the horizontal pin $e$ extending across the slot in its rear end, between the cam-lever G and the fulcrum of said bar, and serves as a stop to limit the vibratory movement of the long arm of the lever G in either direction, as shown.

The outer end of the bar F has cut vertically through it the slot $f$ to receive the upwardly-projecting shank of a lacing stud or hook, and has its under side cut away to form a shallow enlargement of the lower portion of said slot, as at $g$, to receive the shank head or collar of the stud or hook, and said bar has secured to its under side and spanning said slot $f$ the steel plate $h$ to enter and fill the space between the shank-collar and the outer head of the stud or hook, as shown in Fig. 3.

The steel disks $d$, upon which the cam-levers bear when operating the bars F to mold the plastic material, are adjustable vertically by the set-screws $i\ i$ to adjust the pressure and compensate for the wear of the working ends of the cam-levers G.

H is a stand secured to the front edge of the bench A a little to the left of a line drawn through the axis of revolution of the bed-plate C and at right angles to the front edge of said bench, and has fitted to suitable guideways formed therein a block $j$, the upper portion of which is made of hard rubber or other suitable insulating material, and has secured to opposite sides thereof the two contact spring-fingers $j'$ and $j^2$, connected by the wires $k$ and $k'$, respectively, to the opposite poles of an electric generator K, with a transformer L interposed in said circuit. The inner ends of the spring-fingers $j'$ and $j^2$ are constructed to embrace the die $b$ when moved inward by the operation of the hand-lever I, and adapted to be easily withdrawn therefrom by moving said lever I outward.

J is a main air-conducting pipe, connected at one end with a suitable blast-blower (not shown) and closed at its other end, and provided with a series of branch pipes $l\ l$, which pass up through openings in the bench A in such positions that their open upper ends are each just beneath an opening through the circular bed-plate C, in which is set a socket $a$, carrying a hollow die $b$.

In applying pyroxylin or other similar material to metal objects, it is necessary that said material be heated to soften it, and that it should be subjected to pressure while in said softened state and remain under pressure until the material has cooled and become hard.

To cover such small articles as the heads of lacing studs or hooks at a sufficient rate of speed and in sufficient quantities to make it profitable, a large number of machines have to be kept in constant operation during the working hours of every working day, and if the heating be done by gas-jets the heat will be so transmitted through the machines that in very hot weather the machines cannot be operated effectively through an entire day. To overcome this difficulty or reduce it to a minimum, I arrange each machine with a series of dies and lever-presses, preferably eight, and heat the die by electricity.

The operation of my invention is as follows: The parts of the machine being in the positions shown in the drawings, the operator first moves the hand-lever I outward to withdraw the spring-fingers $j'$ and $j^2$ from contact with the die $b$ and out of the path of the die $b$ next to the right of the one with which said fingers are shown as engaged. She then places a lacing-hook in position in the front of the bar F at the right of the stand H, with the head to be covered beneath the plate $h$ and its shank projecting upward into the slot $f$ in said bar, places a small disk of the covering material on the die beneath said hook, and moves the long arm of the lever G, which is pivoted to the rear of said bar F, forward to depress the outer end of the bar F, with the lacing-hook carried thereby, to clamp said disk and partially shape it. She then moves the bed-plate C about its axis, in the direction indicated by the arrow on Fig. 1, a distance equal to the distance between the centers of two adjacent dies $b$ $b$, or until the spring-stop D snaps into the next notch $c$ to the one it is now engaged with, and then moves the hand-lever I inward, causing the fingers $j'$ and $j^2$ to embrace the die $b$ and close the electric circuit, when the die will instantly be heated to a sufficient degree and the lever G is depressed to its limit. Another hook and disk of covering material is applied to the next die and bar to the right. The lever G of said bar having been previously raised and the hook in the end of said bar removed, said lever is again moved forward and downward to compress said disk, the hand-lever I is moved outward to withdraw the fingers $j'$ and $j^2$ from the die $b$ and break the electric circuit, the wheel is moved another step about its axis, the circuit is again closed, and while the die is being heated the previously-heated die is being exposed to a jet of cold air to cool it while still under pressure. These operations are repeated as rapidly as the operator can pick up and place in position the hooks and disks of covering material and manipulate the levers G and I and move the plate C; but as each die, after being heated and while under pressure, is exposed to jets of cold air for the length of time that is required to pick up and place in position six hooks and six disks of covering material and manipulate the levers G and I and move the bed-plate C six times, the plastic covering is thoroughly cooled before it is removed from the die or the pressure is removed.

Each bar F, with its lever G, a section of the bed-plate C, a stand E, a socket $a$, and a die $b$, constitute a molding-press, eight of which, with an electric circuit and a circuit breaking and closing device, constitute my machine as illustrated.

What I claim as new, and desire to secure by Letters Patent of the United States, is—

1. In a machine for applying plastic coverings to metallic articles, the combination of an intermittently revoluble bed plate; a plurality of molding dies and pressing mechanisms carried by said bed plate; a pair of contact fingers insulated from each other and movable to and from a die to make and break a circuit; a source of electric energy; suitable conducting wires connecting the opposite poles of said source of electric energy with said spring fingers; and means of applying blasts of cold air to a plurality of said dies at the same time.

2. In a machine for applying plastic coverings to metallic articles, the combination of an intermittently revoluble bed plate provided with a plurality of notches in its periphery; a plurality of molding dies and pressing mechanisms carried by said bed plate; a spring stop to engage said notches successively; a pair of contact fingers insulated from each other and movable to and from a die to make or break a circuit, a source of electric energy; and suitable conducting wires connecting the opposite poles of said source of electric energy with said spring fingers.

3. In a machine for applying plastic coverings to metallic articles, the combination of an intermittently revoluble bed plate provided with a plurality of notches or teeth in its periphery; a spring stop constructed and arranged to engage said notches or teeth to register said bed plate in position; a plurality of dies and pressing mechanisms mounted upon said bed-plate at uniform intervals; the fixed stand H; the reciprocating block $j$; the lever I connected to said block; the spring fingers $j'$ and $j^2$; and means for passing a current of electricity through said fingers and a die when the circuit is closed.

4. The combination of the bed-plate C; the die $a, b$; the bar E slotted at its front end and provided with the plate $h$ secured to said bar below the slot $f$ the cam lever G pivoted to the rear end of said bar E; the fixed stand H; the reciprocating block $j$; the spring fingers $j'$ and $j^2$ secured to but insulated from said block and each other; means for moving said block and fingers toward and from said die; and means for passing a current of electricity through said fingers and the die when said fingers engage said die.

In testimony whereof I have signed my name to this specification, in the presence of two subscribing witnesses, on this 23d day of May, A. D. 1895.

MELLEN N. BRAY.

Witnesses:
 N. C. LOMBARD,
 E. I. NESBIT.